United States Patent [19]

Scott et al.

[11] Patent Number: 5,534,153
[45] Date of Patent: Jul. 9, 1996

[54] CONTINUOUS FLUIDIZED-BED CONTACTOR WITH RECYCLE OF SORBENT

[75] Inventors: Charles D. Scott, Oak Ridge, Tenn.; James N. Petersen, Moscow, Id.; Brian H. Davison, Knoxville, Tenn.

[73] Assignee: Martin Marietta Energy Systems, Inc., Oak Ridge, Tenn.

[21] Appl. No.: 919,819

[22] Filed: Jul. 24, 1992

[51] Int. Cl.⁶ .................................................. B01D 15/02
[52] U.S. Cl. ........................... 210/661; 210/676; 210/682; 210/688
[58] Field of Search ..................... 210/661, 675, 210/676, 682, 688, 189, 268, 269

[56] References Cited

U.S. PATENT DOCUMENTS

| | | | |
|---|---|---|---|
| 2,632,720 | 3/1953 | Perry | 210/661 |
| 2,742,381 | 4/1956 | Weiss et al. | 210/661 |
| 3,445,382 | 5/1969 | Wace | 210/661 |
| 3,551,118 | 12/1970 | Cloete et al. | 210/661 |
| 4,400,279 | 8/1983 | Wahl et al. | 210/679 |
| 4,435,366 | 3/1984 | Heitkamp et al. | 210/682 |
| 4,876,036 | 10/1989 | Candau et al. | 210/682 |
| 4,978,647 | 12/1990 | Scott et al. | 502/7 |
| 4,995,985 | 2/1991 | Scott et al. | 210/679 |

OTHER PUBLICATIONS

Rosenweig, R. E., Fluidization: Hydrodynamic Stabilization with a Magnetic Field, Science, vol. 204, No. 6, 57–60 (Apr. 1979).

Watson, J. S. et al., Electrically Stabilized Expanded Beds for Sorption Separations, Separation Science and Technology, vol. 22, Nos. 2 and 3, 949–961 (1987).

Byers, C. H., Effects of Particle Shape and Size Distribution on Sorption and Flow Performance in Electrically Stabilized Expanded Beds, Separation Science and Technology, vol. 23, Nos. 12 and 13, 1969–1987 (1988).

Watson, J. S., et al., Adsorption of Sr by Immobilized Microorganisms, Applied Biochemistry and Biotechnology, vol. 20/21, 699–709 (1989).

Petersen, J. N. et al., Accumulation of $Cu^{++}$ Onto Modified Bone–Gelatin Beads, Biotechnology Techniques, vol. 4, No. 6, 435–440 (1990).

*Primary Examiner*—Ivars Cintins
*Attorney, Agent, or Firm*—P. H. Smirman; H. W. Adams

[57] ABSTRACT

A continuous fluidized-bed contactor containing sorbent particles is used to remove solutes from liquid solvents. As the sorbent particles, for example gel beads, sorb the solute, for example metal ion species, the sorbent particles tend to decrease in diameter. These smaller loaded sorbent particles rise to the top of the contactor, as larger sorbent particles remain at the bottom of the contactor as a result of normal hydraulic forces. The smaller loaded sorbent particles are then recovered, regenerated, and reintroduced into the contactor. Alternatively, the loaded sorbent particles may also slightly increase in diameter, or exhibit no change in diameter but an increase in density. As a result of normal hydraulic forces the larger loaded sorbent particles fall to the bottom of the contactor. The larger loaded sorbent particles are then recovered, regenerated, and reintroduced into the contactor.

12 Claims, 8 Drawing Sheets

CONTINUOUS FLUIDIZED-BED CONTACTOR WITH RECYCLE OF SORBENT

This invention was made with Government support under Contract No. DE-AC05-84OR21400 awarded by the Office of Energy Research of the U.S. Department of Energy to Martin Marietta Energy Systems, Inc. and the Government has certain rights in this invention.

FIELD OF THE INVENTION

This invention relates to the use of sorbent particles to remove solutes from solvents, and more particularly to a continuous fluidized-bed contactor with process-induced recycle of the sorbent.

BACKGROUND OF THE INVENTION

Many types of sorbent particles are used to remove solutes from gaseous or liquid solvents, either to isolate and concentrate resource materials or to remove hazardous wastes or pollutants. A sorbent is generally defined as a material, compound, or system that can provide a sorption function, such as adsorption, absorption, or desorption. A solvent is generally defined as that part of a solution that is present in the largest amount, or the compound that is normally liquid in the pure state. A solute is generally defined as the substance dissolved in a solvent. When a compound is dissolved in a solvent, its components usually dissociate into their ionic forms. The ion with a net positive charge is referred to as the cation, whereas the ion with a net negative charge is referred to as the anion. For example, a metal-containing compound such as silver nitrate would dissociate in solution into silver cations and nitrate anions. Other metal-containing compounds generally behave in the same way in solution. Of particular interest is the recovery of metallic ion species, especially metallic ion species with an atomic weight of about 50 or greater, from various liquids. These metals encompass a large number of elements, including but not limited to, metals such as copper, uranium, strontium, cadmium, silver, mercury, iron, and lead. In a liquid containing at least one type of metallic ion specie, the solute would be the metallic ion specie, whereas the liquid would be the solvent. The material used to remove the solute from the solvent is the sorbent. In such a case the solute would also be referred to as the sorbate. A sorbate is generally defined as the substance sorbed by a sorbent.

Conventional fluidized-bed contactors usually operate as a columnar chamber through which there is an upflow or fluid that suspends the sorbent particles in the active portion of the contactor. The fluidized sorbent particles tend to migrate throughout the expanded bed with constant movement while the fluid progresses up through these sorbent particles, essentially as a front as in plug flow. Plug flow, also known as slug or piston flow, is generally defined as a fluid flow in which the fluid flows as a front with no mixing or diffusion along the flow path.

In conventional fluidized-beds essentially all of the sorbent particles will be contacted with high concentrations of tile solute over a relatively short period of time, therefore the effluent concentration of the solute will tend to breakthrough or increase after a short time of contact. Breakthrough is generally defined as the first appearance in the effluent of unsorbed solute of the type which is being sorbed by the sorbent. This usually indicates that the bed needs to be regenerated, causing the entire contactor to be taken off-line.

A fixed-bed of sorbent particles represents a somewhat more efficient contactor with later breakthrough. However, it has a major disadvantage in that after the sorbent particles are loaded with the solute, the entire contactor must be taken off-line while the sorbent is regenerated. On the other hand, the sorbent particles in fluidized-bed contactors are relatively easy to add or remove on a continuous or semi-continuous basis so that such a contactor could be operated continuously with the sorbent particles regenerated in a separate unit and recycled back to the contactor.

There is a need for a fluidized-bed contactor system in which fresh sorbent particles tend to migrate to the portion of the contactor with the highest concentration of solute, while solute-loaded sorbent particles are segregated in another area within the fluidized-bed where they can be easily removed.

OBJECTS OF THE INVENTION

Accordingly, it is an object of the present invention to provide a new and improved apparatus for removing solutes from solvents.

It is an object of the present invention to provide a new and improved method for removing solutes from solvents.

It is another object of the present invention to provide a new and improved method for reducing the cost of solute extraction.

It is another object of the present invention to provide a new and improved method for reducing the time required for solute extraction.

Further and other objects of the present invention will become apparent from the description contained herein.

SUMMARY OF THE INVENTION

In accordance with one aspect of the present invention, the foregoing and other objects are achieved by:

- a fluidized-bed type contactor vessel having a fluid inlet and a fluid outlet;
- a fluid solvent phase flowing upwardly through said contactor vessel, said fluid solvent phase containing a sorbate; and
- a fluidized particulate sorbent phase in said contactor vessel, said particulate sorbent phase migrating through said contactor vessel, said particulate sorbent phase having a sedimentation velocity that is dependent on sorbate loading, said particulate sorbent phase sorbing said sorbate.

In accordance with another aspect of the present invention, the foregoing and other objects are achieved by:

- providing a contactor vessel having a fluid inlet and a fluid outlet;
- introducing into said contactor vessel an upwardly flowing fluid solvent phase containing a sorbate;
- introducing into said contactor vessel a particulate sorbent phase having a sedimentation velocity that allows said particulate sorbent phase to be suspended by said upwardly flowing fluid solvent phase, said particulate sorbent phase sorbing said sorbate resulting in a sorbate-loaded particulate sorbent phase having a decreased sedimentation velocity so that said sorbate-loaded particulate sorbent phase migrates upwardly; and
- recovering said sorbate-loaded particulate sorbent phase.

In accordance with another aspect of the present invention, the foregoing and other objects are achieved by:

providing a contactor vessel having a fluid inlet and a fluid outlet;

introducing into said contactor vessel an upwardly flowing fluid solvent phase containing a sorbate;

introducing into said contactor vessel a particulate sorbent phase having a sedimentation velocity that allows said particulate sorbent phase to be suspended by said upwardly flowing fluid solvent phase, said particulate sorbent phase sorbing said sorbate resulting in a sorbate-loaded particulate sorbent phase having an increased sedimentation velocity so that said sorbate-loaded particulate sorbent phase migrates downwardly; and recovering said sorbate-loaded particulate sorbent phase.

DETAILED DESCRIPTION OF THE PREFERRED EMBODIMENTS

The present invention is based upon the unexpected observation that when certain gelatinous particles in the form of spherical beads (bone gelatin cross-linked with modified alginate, for example) are subjected to an aqueous solvent with dissolved metal solutes, the gel bead will sorb the metal ions. The gel bead is thus referred to as the sorbent, whereas the metal ion is referred to as the sorbate. A complete description of this technology is found in U.S. Pat. Nos. 4,978,647 and 4,995,985, both to C. D. Scott et al., the disclosures of both of which are incorporated herein by reference. Sorption of metal ions by immobilized sorbents has been confirmed for several metallic species. Modified bone gel beads have been shown to sorb copper, uranium, strontium, cadmium, and silver ions in various qualitative and quantitative tests. As the gel beads sorb the metal ions they diminish in diameter to a degree that appears to be proportional to the quantity of metal ions sorbed. Such sorbent beads, when introduced into a fluidized-bed contactor, will accumulate and remove the metal ions from the upflowing feed stream, providing an effluent with lower concentrations of the metal solute.

Figure 1:
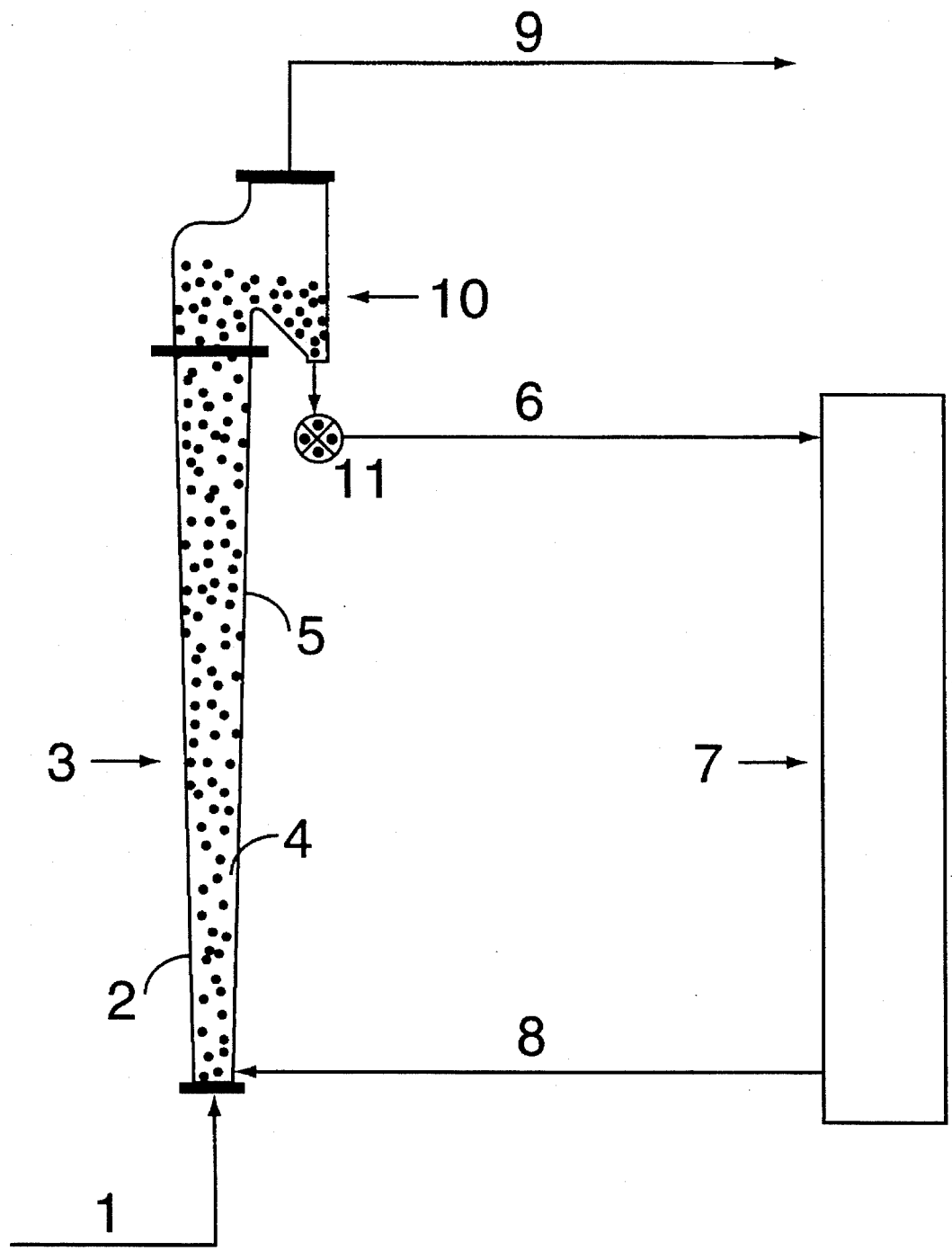
FIG. 1 is a schematic diagram of a fluidized-bed contactor with fresh beads added at the bottom of the column and the smaller loaded beads removed at the top.

With reference to FIG. 1, a upwardly flowing fresh fluid stream 1 containing the sorbate 2, in this case metal ions, are introduced at the bottom of the fluidized-bed contactor 3. The fluidized-bed contactor 3 has a fluid inlet and a fluid outlet. The fluid stream 1 is referred to as the fluid solvent phase. Sorbent beads 4 are then introduced into the fluidized-bed contactor 3. The sorbent beads 4 may be introduced into the fluidized-bed contactor 3 by using a device such as a screw feeder. The sorbent beads 4 are referred to as the fluidized particulate sorbent phase. As the sorbent beads 4 sorb the sorbate 2 they decrease in diameter. Due to the actions of normal hydraulic forces on smaller particles and the resulting decrease in sedimentation velocity, these loaded sorbent beads 5 tend to migrate to the top of the fluidized-bed contactor 4 to a settling region 10 where they are easily removed by a device such as a rotating multivane star valve 11. The fluid stream 1 which has had the sorbate 2 removed, forms effluent stream 9, which is removed from the top of the fluidized-bed contactor 3. The loaded sorbent beads 5 are then transported by a device such as a screw feeder 6 to regenerator 7 where they are regenerated by separation of the metal ions from the sorbent beads by either chemical exchange, thermal cycle or other methods. Usually separation is accomplished by washing the loaded sorbent beads 5 in an acidic solution where the hydrogen ions displace the metal cations at the sorption sites, allowing the metal ions to be removed in the aqueous solution. The regenerated sorbent beads 8 are then circulated back to the fluidized-bed contactor 3 by reintroduction at the top or bottom of the fluidized-bed contactor 3. Reintroduction can be accomplished by using a device such as a screw feeder. The regenerated sorbent beads 8, being of larger diameter thus having an increased sedimentation velocity, will again tend to migrate to the lower region of the fluidized-bed contactor 3 where they will be exposed to the fresh feed stream 1.

Figure 2:
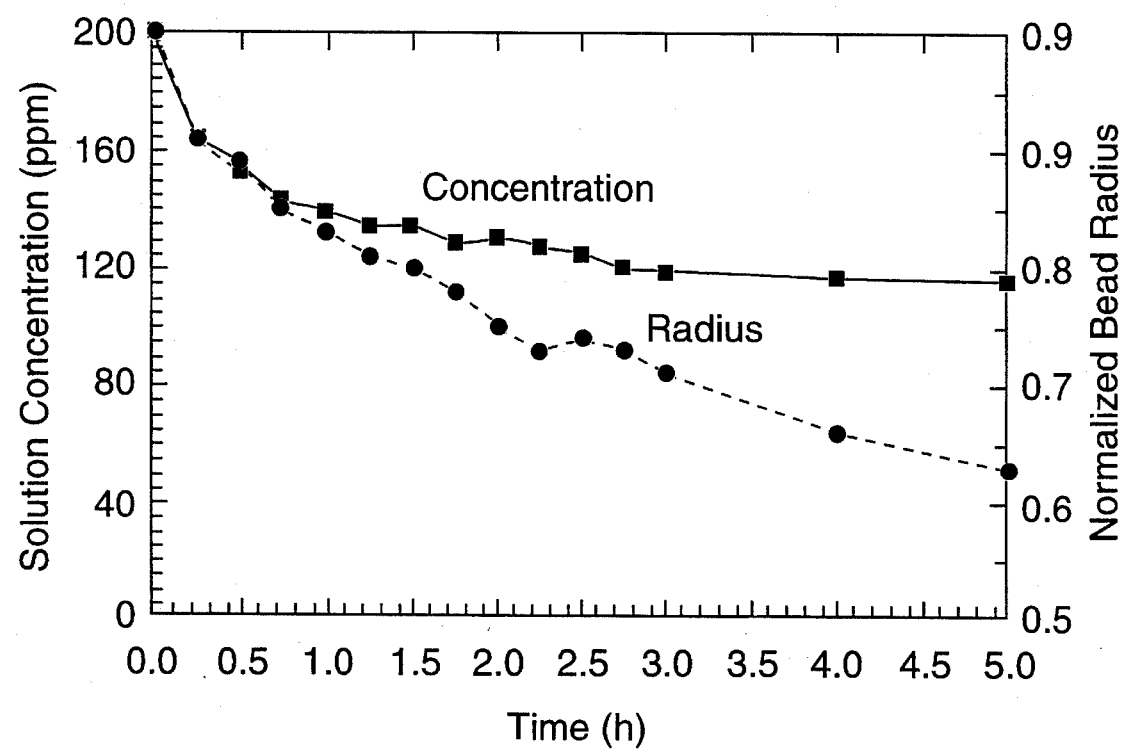
FIG. 2 is a graphical illustration of the size change of sorbent beads during sorption of copper ions.

With reference to FIG. 2, the size change of the sorbent beads during sorption of copper ions is illustrated. For example, prior to contact with the sorbate, the sorbent beads typically have diameters of about 0.9 to about 1.0 cm. However, as the sorbent beads sorb the sorbate their diameters are reduced to about 0.6 to about 0.65 cm. Other sizes of sorbent beads show similar diameter changes. Although their density has increased slightly by sorbing some of the metal ions, the sorbent beads do not migrate to the lower region of the fluidized-bed contactor because the effect on sedimentation velocity caused by a decrease in the diameter of the sorbent beads is greater than the effect of the increase in density. Therefore, as a result of normal hydraulic forces, the loaded sorbent beads do not experience an increase in sedimentation velocity, but rather a decrease in sedimentation velocity and as a result tend to rise. The sorbent beads have a sedimentation velocity that is dependent on sorbate loading. It is this feature that allows the loaded sorbent beads to migrate to the top of the fluidized-bed contactor where they can be recovered and recycled.

Figure 3:
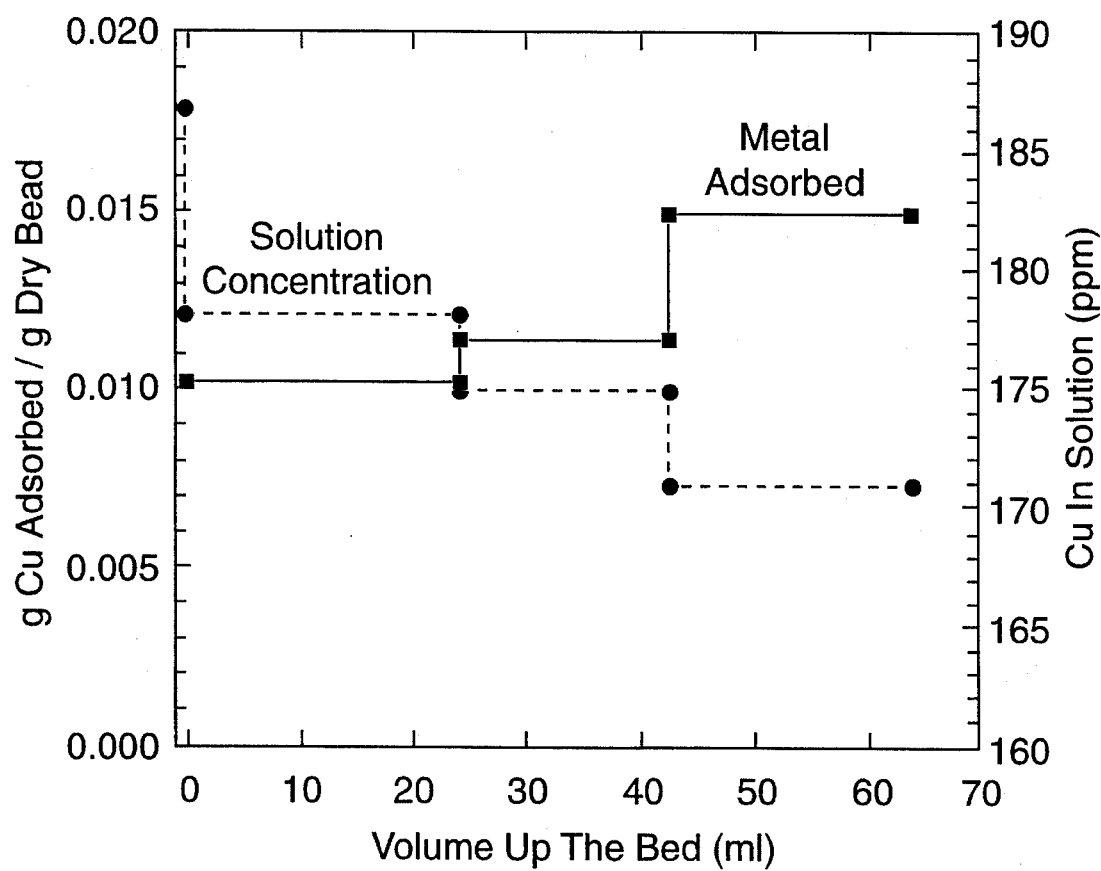
FIG. 3 is a graphical illustration of the concentration and loading profiles from a test of a fluidized-bed contactor, operated in accordance with the present invention.

With reference to FIG. 3, a concentration and loading profile from a test of the fluidized bed contactor, operated in accordance with the present invention, is presented. FIG. 3 illustrates that as the metal ions are sorbed by the sorbent beads, the metal ion concentration of the solution decreases. This test also illustrates that the loaded sorbent beads (those with the smallest diameters) have accumulated at the top of the contactor.

The present invention is compatible with any type of sorbent particles that exhibit different sedimentation velocities as they are loaded by the sorbate. In addition to the situation previously described where the sorbent particles sedimentation velocity decreases as they are loaded, it is conceivable that some sorbents would also increase in sedimentation velocity. Sedimentation velocity would increase if the sorbent particle becomes larger as it is loaded with sorbate or if there is minimal change in diameter, but an increase in density. For example, non-gelatinous sorbents such as inorganic oxides or porous glass, should not change dimensions, but should increase in density, thus causing them to migrate to the bottom of the contactor. In either of these cases, the loaded sorbent particle would be removed from the bottom of the fluidized-beds while fresh sorbent particles would be added to the top of the contactor.

Examples of a continuous fluidized-bed contactor with process-induced recycle of sorbent, operated in accordance with the present invention, are presented below:

EXAMPLE I

Stable sorbent beads were made from bone gelatin cross-linked by modified alginate. These beads were in the size range of about 0.9 to about 1.0-cm-diam. The sorbent was contacted with an aqueous solution of 3.15 mM Cu (NO$_3$)$_2$ for five hours at a pH of about 5, and it was found that as the Cu$^{++}$ was sorbed, the beads tended to progressively decrease in size.

EXAMPLE II

Figure 4:
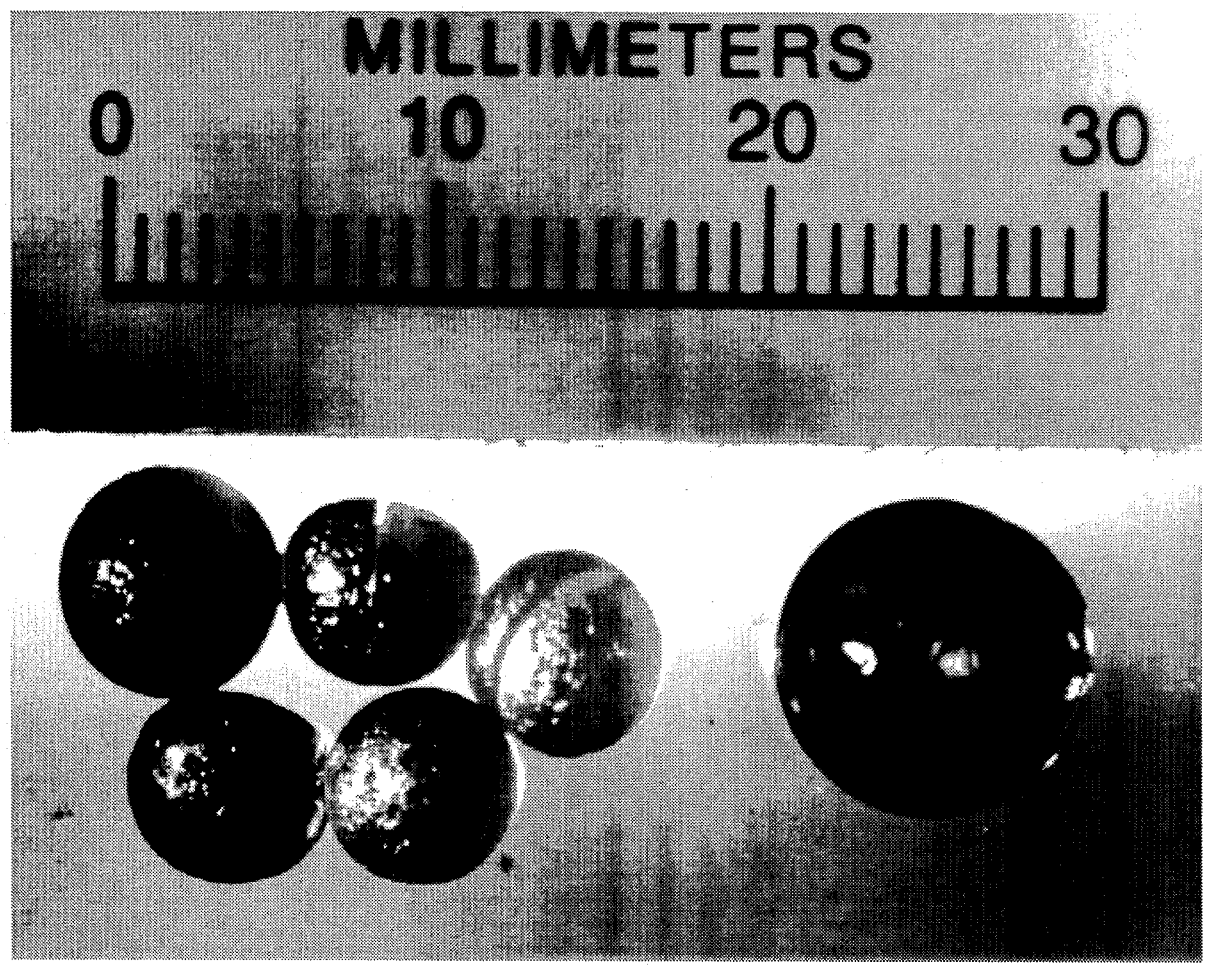
FIG. 4 is a photographic illustration of the change in diameter of sorbent beads that have sorbed copper ions.

Sorbent beads were prepared in accordance with Example I and were introduced into a fluidized-bed contactor. These beads were in the size range of about 1.1 to about 1.7-cm-diam. An aqueous feed solution of 3.15 mM Cu(NO$_3$)$_2$ at a pH of about 5 was introduced to the bottom of the contactor, and fresh beads were introduced at the top. After a fixed time period, the bed was drained such that the properties of the materials contained in the bottom, middle, and top portions of the contactor could be determined. Analysis indicated that the fresh larger beads that were added to the top of the fluidized bed did migrate to the bottom of the bed, while the smaller loaded beads progressed to the top of the column. At the same time, the solution Cu$^{++}$ concentration decreased significantly as the fluid progressed through the bed. The diameters of the sorbent beads was observed to have decreased significantly as they sorbed the copper ions. This effect is illustrated in FIG. 4, which shows the sorbent beads before (right portion of the figure) and after (left portion of the figure) sorption of the copper ions.

EXAMPLE III

Figure 5:
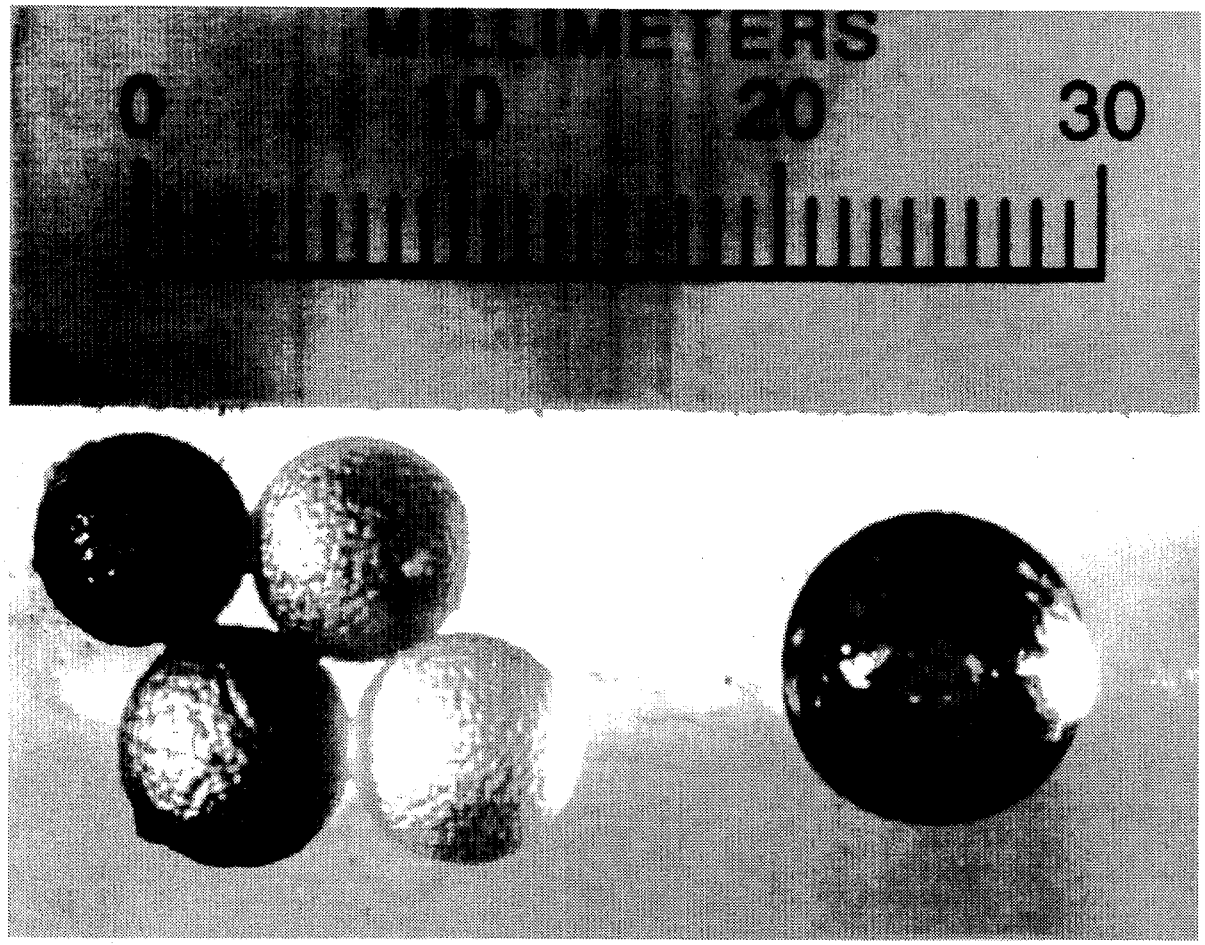
FIG. 5 is a photographic illustration of the change in diameter of sorbent beads that have sorbed uranium ions.

A procedure similar to Example I was carried out, with the exception that the aqueous feed solution contained approximately 1000 parts per million (ppm) of uranyl nitrate instead of copper nitrate. After approximately the same time of exposure as used in Example I, the diameters of the sorbent beads were again observed to have decreased significantly as they sorbed the uranium ions. This effect is illustrated in FIG. 5, which shows the sorbent beads before (right portion of the figure) and after (left portion of the figure) sorption of the uranium ions.

EXAMPLE IV

Figure 6:
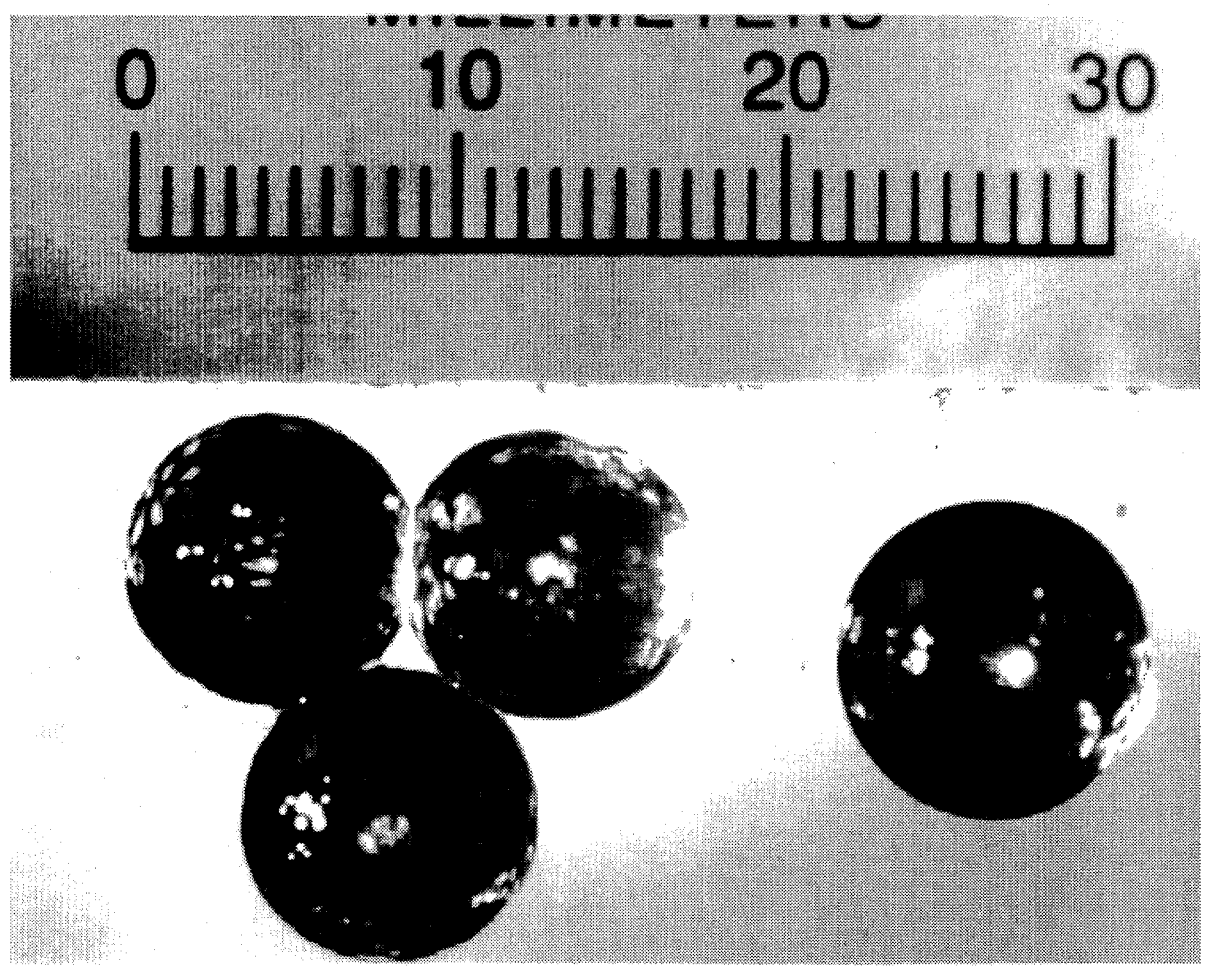
FIG. 6 is a photographic illustration of the change in diameter of sorbent beads that have sorbed strontium ions.

A procedure similar to Example III was carried out, with the exception that the aqueous feed solution contained strontium chloride instead of uranyl nitrate. After approximately the same time of exposure as used for Example III, the diameters of the sorbent beads were again observed to have decreased significantly as they sorbed the strontium ions. This effect is illustrated in FIG. 6, which shows the sorbent beads before (right portion of the figure) and after (left portion of the figure) sorption of the strontium ions.

EXAMPLE V

Figure 7:
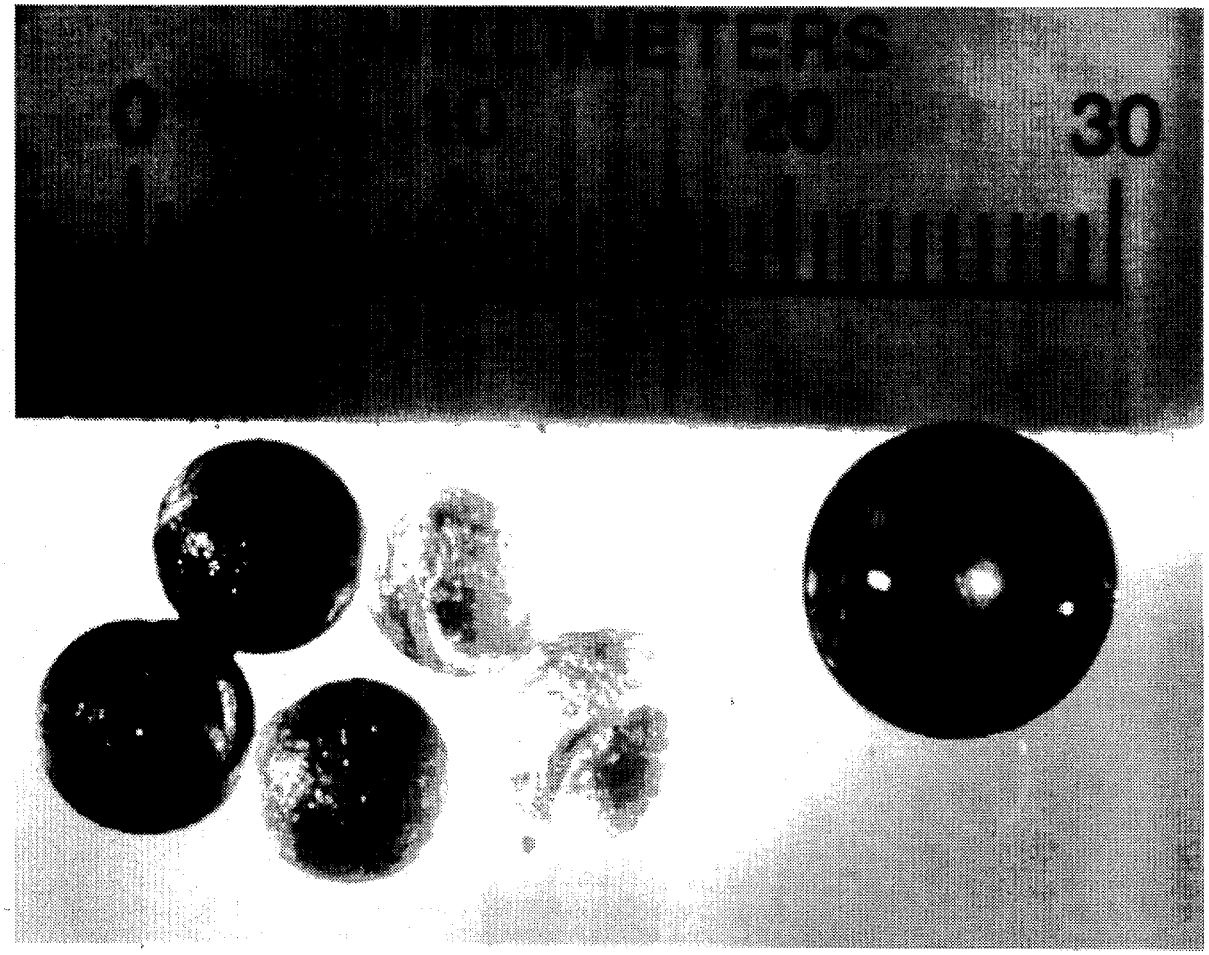
FIG. 7 is a photographic illustration of the change in diameter of sorbent beads that have sorbed cadmium ions.

A procedure similar to Example IV was carried out, with the exception that the aqueous feed solution contained cadmium nitrate instead of strontium chloride. After approximately the same time of exposure as used for Example IV, the diameters of the sorbent beads were again observed to have decreased significantly as they sorbed the cadmium ions. This effect is illustrated in FIG. 7, which shows the sorbent beads before (right portion of the figure) and after (left portion of the figure) sorption of the cadmium ions.

EXAMPLE VI

Figure 8:
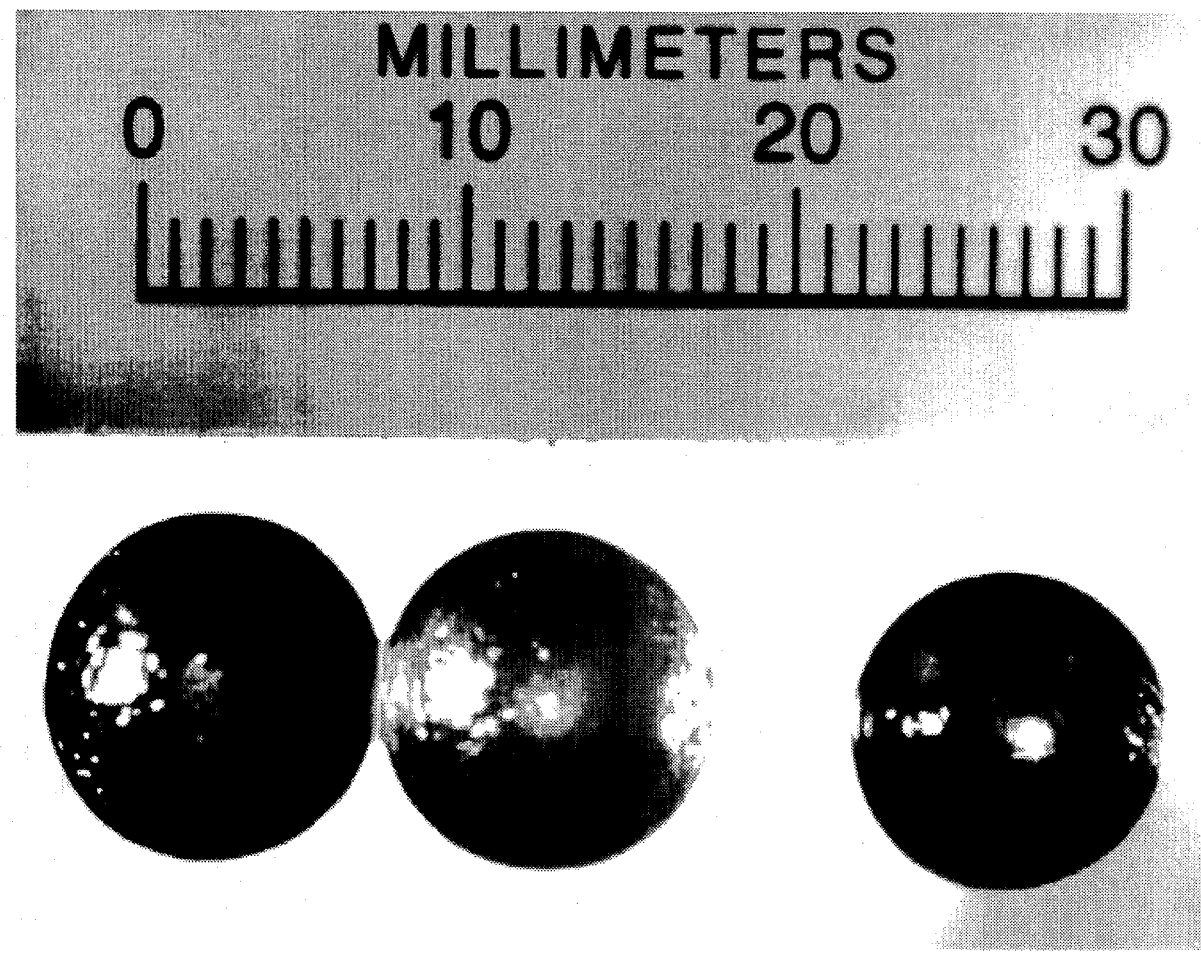
FIG. 8 is a photographic illustration of the change in diameter of sorbent beads that have sorbed silver ions.

A procedure similar to Example V was carried out, with the exception that the aqueous feed solution contained silver nitrate instead of cadmium nitrate. After approximately the same time of exposure as used in Example V, the diameters of the sorbent beads were again observed to have decreased slightly as they sorbed the silver ions. This effect is illustrated in FIG. 8, which shows the sorbent beads before (left portion of the figure) and after (right portion of the figure) sorption of the silver ions.

The amount of diameter shrinkage experienced by the sorbent beads of the previous example is quite dramatic. Although it can not be discerned from FIGS. 4–8, there was a noticeable color change as the sorbent beads sorbed the various metals. This color change is indicative of the fact that the metal ions were being concentrated in the sorbent beads. In the case of copper ion sorption, the sorbent beads took on a bluish color. In the case of uranium ion sorption, the sorbent beads took on a yellowish-white color. In the case of strontium, cadmium and silver ion sorption, the sorbent beads took on a light grey color.

It is conceivable that metallic ion species other than those previously discussed will also cause diameter shrinkage of the sorbent beads as they sorb these different metallic ion species. This could include most divalent or trivalent metallic cations including some transition metals. A minimal amount of experimentation is expected of one skilled in the art to determine which metallic species are most suitable for this process.

While there has been shown and described what are at present considered the preferred embodiments of the invention, it will be obvious to those skilled in the art that various changes and modifications can be made therein without departing from the scope of the inventions defined by the appended claims.

What is claimed is:

1. A method of operating a fluidized-bed contactor system, comprising the steps of:

providing a contactor vessel having a fluid inlet and a fluid outlet;

introducing into said contactor vessel an upwardly flowing fluid solvent phase containing a sorbate;

introducing into said contactor vessel a particulate sorbent phase having a sedimentation velocity that allows said particulate sorbent phase to be suspended by said upwardly flowing fluid solvent phase, said particulate sorbent phase sorbing said sorbate resulting in a sorbate-loaded particulate sorbent phase having a decreased sedimentation velocity so that said sorbate-loaded particulate sorbent phase migrates upwardly, said particulate sorbent phase decreasing in diameter as said particulate sorbent phase sorbs said sorbate; and recovering said sorbate-loaded particulate sorbent phase.

2. A method in accordance with claim 1, wherein said particulate sorbent phase comprises a gel bead.

3. A method in accordance with claim 1, wherein said sorbate comprises a metal ion.

4. A method in accordance with claim 3, wherein said metal ion has an atomic weight of about 50 or greater.

5. A method in accordance with claim 3, wherein said metal ion comprises copper.

6. A method in accordance with claim 3, wherein said metal ion comprises uranium.

7. A method in accordance with claim 3, wherein said metal ion comprises strontium.

8. A method in accordance with claim 3, wherein said metal-ion comprises cadmium.

9. A method in accordance with claim 3, wherein said metal ion comprises silver.

10. A method in accordance with claim 1, further comprising the additional step of separating said sorbate from said sorbate-loaded particulate sorbent phase.

11. A method in accordance with claim 10, further comprising the additional step of recovering said sorbate.

12. A method in accordance with claim 11, further comprising the additional step of reintroducing said particulate sorbent phase back into said contactor vessel.

* * * * *